Oct. 20, 1970 P. J. WAZNYS ET AL 3,535,476
MULTI-SPEED ENCODER
Original Filed Aug. 14, 1967 2 Sheets-Sheet 1
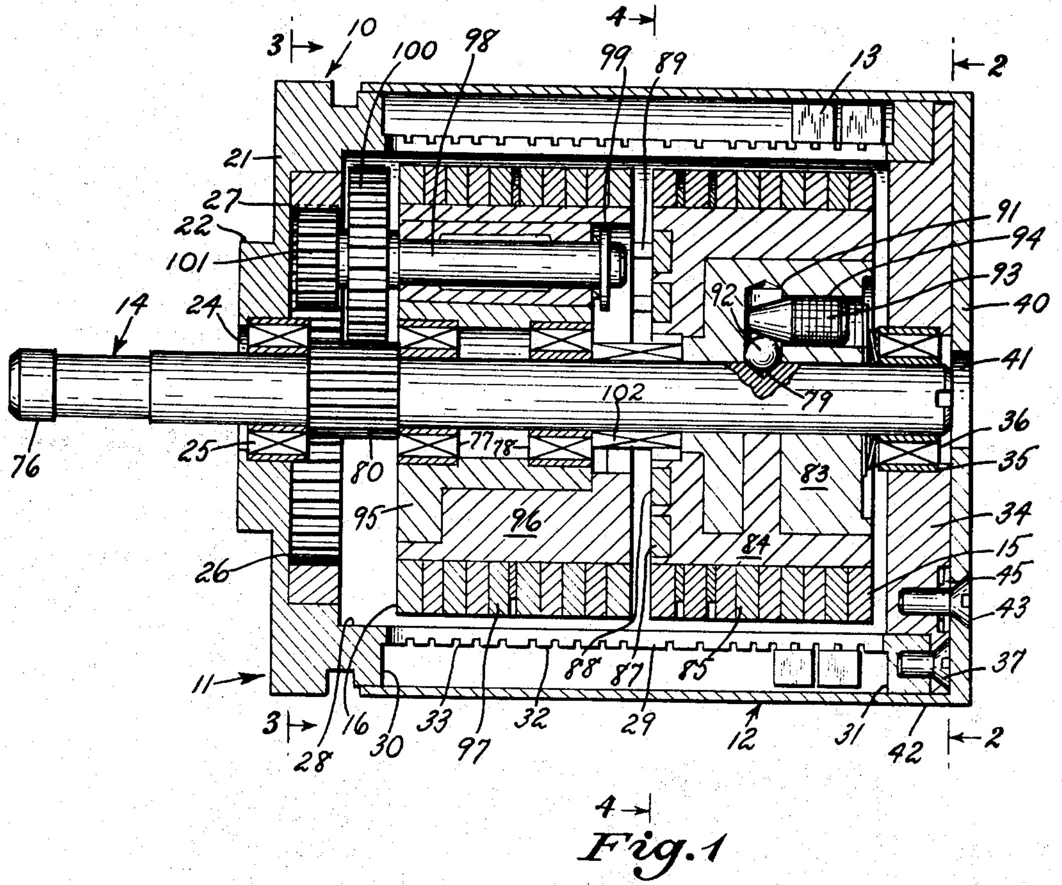
Fig. 1
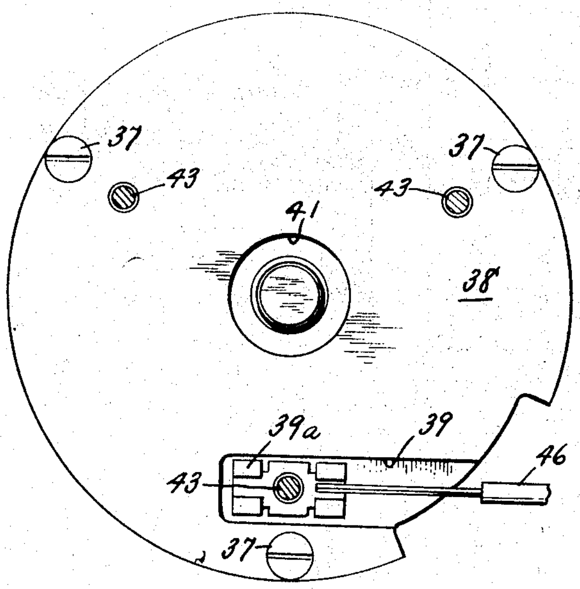
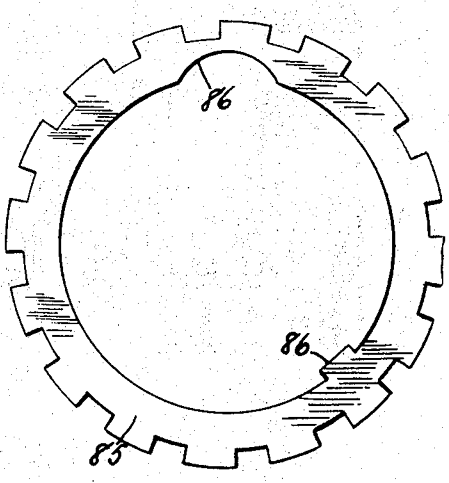
Fig. 2 Fig. 11

United States Patent Office 3,535,476
Patented Oct. 20, 1970

3,535,476

MULTI-SPEED ENCODER

Peter J. Waznys, Richmond Hill, N.Y., and John A. Garrido, Englishtown, N.J., assignors to Collectron Corporation, New York, N.Y., a corporation of New York Original application Aug. 14, 1967, Ser. No. 660,252, now Patent No. 3,457,378, dated July 22, 1969. Divided and this application Feb. 17, 1969, Ser. No. 825,462
Int. Cl. H01h *19/56*
U.S. Cl. 200—8 1 Claim

ABSTRACT OF THE DISCLOSURE

A multi-speed digital encoder employing a plurality of code patterns, one of which moves at a submultiple of rotation with respect to the other, and including improved means facilitating assembly, adjustment of brushes and mechanical durability.

This is a division of application Ser. No. 660,252, now U.S. Pat. No. 3,457,378 filed Aug. 14, 1967.

This invention relates generally to the field of drum type digital encoders, and more particularly to an improved multi-speed type of high accuracy, and employing an improved code pattern of the type disclosed in the copending application of John L. Mueller, Ser. No. 650,881, filed July 3, 1969, and assigned to the same assignee as the present application.

It is among the principal objects of the present invention to provide, in a digital encoder of the class described an improved means for positioning and anchoring the code carrying rotors with respect to a driven shaft, whereby assembly of the device is facilitated.

Another object of the invention lies in the provision, in a device of the above described class of improved brush holder means having precision adjustment means.

Yet another object of the invention lies in the provision of an improved construction of the type described which includes means for effectively covering and sealing the code patterns and cooperating brushes from contamination in the environs of their installed locations.

These objects and features, as well as other incidental ends and advantages, will more fully appear in the progress of the following disclosure, and be pointed out in the appended claim.

In the drawings, to which reference will be made in the specification, similar reference characters have been employed to designate corresponding parts throughout the several views.

FIG. 1 is a central longitudinal sectional view of an embodiment of the invention.

FIG. 2 is an end elevational view thereof, as seen from the right hand portion of FIG. 1.

FIG. 11 is a view in elevation of one of the rings forming part of the code pattern comprising a part of the embodiment.

Figure 3:
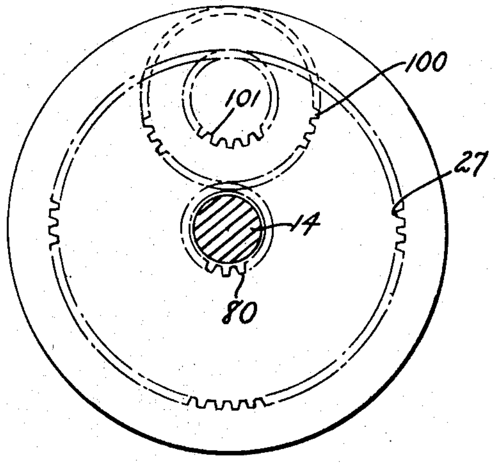
FIG. 3 is a transverse sectional view of a housing component, as seen from the plane 3—3 in FIG. 1.
Figure 4:
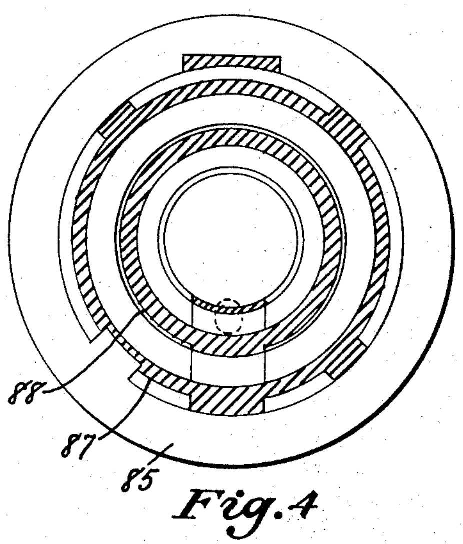
FIG. 4 is a transverse sectional view as seen from the plane 4—4 in FIG. 1.

In accordance with the invention, the device, generally indicated by reference character 10 comprises broadly: a housing element 11, a housing cover element 12, a plurality of individual brush holder elements 13, a driven shaft element 14, a first or directly driven drum element 15 and second or geared drum element 16.

The housing element 11 may be formed by precision casting or machining, and includes an end wall member 21 including alignment means 22 for mounting the same as well as a retaining groove for the same purpose. The wall member 21 includes a central opening or bore 24 which mounts a bearing 25 supporting the shaft element 14.

Surrounding the bearing 25 is an annular recess 26, the side walls of which include an internal ring gear 27 which forms part of the motion transmitting for driving the geared drum element 16. This recess communicates with a larger recess 28 which accommodates both the drum element 15 and the drum element 16.

The recess 28 is formed by a cylindrically shaped sleeve 29 bounded by first and second flanges 30 and 31, respectively as well as a recessed surface 32 having a plurality of parallel grooves 33 which form means for adjusting mounted brush holder elements 13, as will more fully appear hereinafter. Closing the chamber 28 is an end wall member 34 having a centrally disposed opening or bore 35 mounting a bearing 36 which supports an end of the shaft element 14.

The member 34 is maintained in position by screw means 37 which threadedly engage the flange 31. An outer surface 38 includes a recess 39 for a grounding terminal **39*a*** (see FIG. 2).

The housing or cover element 12 may be formed as a drawing operation and includes an end wall 40 defining an aligned opening 41 as well as a cylindrical wall member 42 which overlies the recessed surface 32. Screw retaining means 43 (FIG. 2) retain the cover in position. An opening 45 permits passage of the ground conductor 46 connected at its inner end to the terminal **39*a***.

The brush holder elements 13 are all generally similar, and accordingly, a detailed description of one of said elements will serve equally well to describe all. Referring to FIGS. 6 to 10 in the drawings, inclusive, each element 13 includes a main body member 49 bounded by a curved inner surface 50, planar outer surfaces 51 and 52, and including a slotted opening 53. An elongated recess 54 accommodates a brush wire holder 55 of planar configuration to which the individual brush wires 56 are soldered or otherwise electrically interconnected on one surface 57 thereof. A conductor 58 is suitably attached to the opposite surface 59 thereof, and after positioning within the recess 54, a cover 60 is force fitted into the recess to seal the interconnection.

Figure 5:
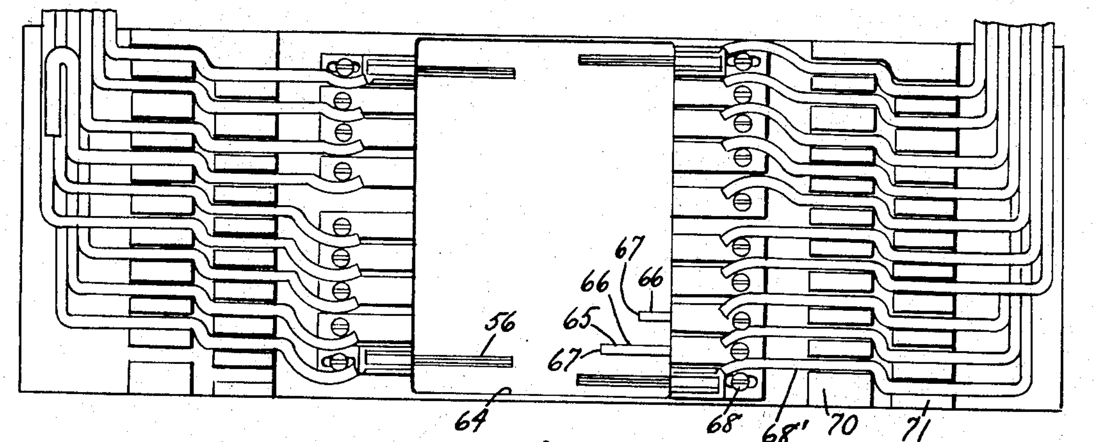
FIG. 5 is a developed view of the outer surface of a housing showing the location of certain brush holding elements and associated strain relief means.
Figure 7:
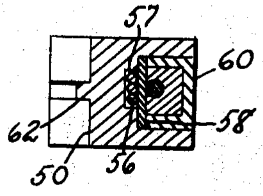
FIG. 7 is a sectional view, partly in elevational as seen from the plane 7—7 in FIG. 6.
Figure 6:
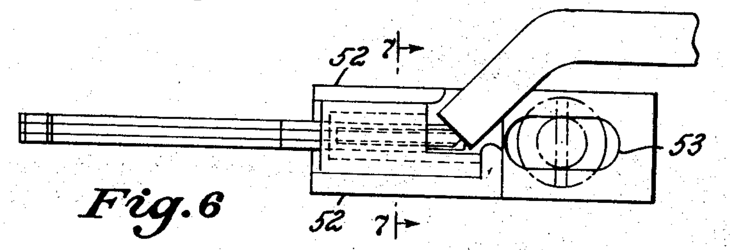
FIG. 6 is a plan view of an individual brush holder element forming a part of the disclosed embodiment.
Figure 10:
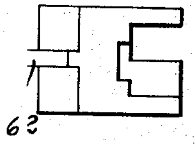
FIG. 10 is an end elevational view as seen from the right hand portion of FIG. 9.
Figure 9:
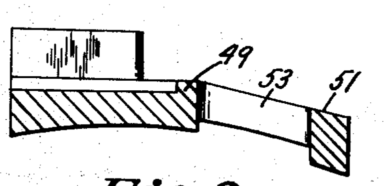
FIG. 9 is a longitudinal central sectional view as seen from the plane 9—9 in FIG. 8.
Figure 8:
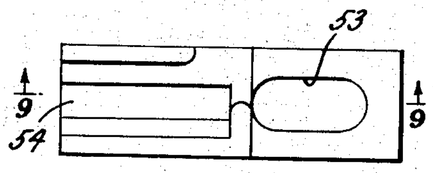
FIG. 8 is a view in elevation corresponding to that seen in FIG. 6, with certain of the component parts removed for purposes of clarity.

The surface 50 is provided with a longitudinally arranged elongated projection or tongue 62 selectively engageable with any of the grooves 33. As seen in Fig. 5 in the drawings, the housing element 11 is provided with one or more generally rectangularly shaped openings 64 which overlie the code pattern 65 formed of conductive strips 66 each having terminals 67. A screw 68 penetrates the opening 53, and retains the brush holder in operative position, while permitting adjustment of the brush wire tip with respect to the terminal 67 of an individual strip 66 by sliding the brush holder longitudinally with respect to the grooves 33. Once the proper adjustment has been made, the screw is tightened to maintain the same for continued operation. Following this adjustment, the conductor 58 is positioned within the interstices formed by a first set of projections 70 and a second set of projections 71 which are offset relative to the first set 70, whereby the conductor is forced into an S-bend thereby forming a strain relief.

The driven shaft element 14 is best seen in FIG. 1 in the drawings, and includes a projecting hub 76 supported in the above mentioned bearings 25 and 36, as well as internal bearings 77 and 78. Disposed in an outer cylindrical surface is a conical recess 79 accommodating detent means to be subsequently described, as well as a gear 80 forming part of the driving means for the second drum element 16.

The first or directly driven drum element 15 includes a main body 83 surrounded by an insulative member 84, in turn supporting a plurality of code-bearing conductive rings 85 (see FIG. 11). The rings 85 include keying means 86 for maintaining the same in proper rotational alignment, so as to be capable of maintaining a fixed adjustment with respect to the brush holder elements. Disposed upon an inner planar surface are a pair of commutator rings 87 and 88 which together with a pair of corresponding brushes 89 on the second drum element 16 provide means for electrical communication between the code patterns on each drum element.

The element 15 is fixed relative to the shaft element 14 by set-screw means accessible from an outwardly disposed end surface thereof, so as not to interfere with the location of the rings 85. To accomplish this, there is provided a transverse recess 91 in which there is disposed a locking ball or sphere 92 maintained in position by a threaded wedging member 93 in a longitudinally positioned threaded bore 94.

The second or geared drum element 16 includes a corresponding main body member 95 and insulative member 96, and corresponding code-bearing rings 97. An eccentrically arranged shaft 98 is maintained in position by a retaining ring 99, and mounts a gear 100 meshing with the gear 80 as well as a gear 101 meshing with the internal ring gear 27. Axial alignment is accomplished by a spring retainer 102 which contacts the first drum element 15.

We wish it to be understood that we do not consider the invention limited to the precise details of structure shown and set forth in this specification, for obvious modifications will occur to those skilled in the art to which the invention pertains.

We claim:

1. In a multi-speed drum encoder, a driven shaft, a first drum fixed to said shaft for rotation therewith, a second drum, gear reduction means interconnecting said second drum and said shaft, said second drum surrounding said shaft and rotating coaxially with said first drum, each of said drums having an outer cylindrical surface having a code pattern conductive surface thereon, each having opposed planar end surfaces in mutually spaced relation, and slip ring and brush means disposed uopn said end surfaces for establishing continuous electrical communication between said first and second drums.

References Cited

UNITED STATES PATENTS

| | | | |
|---|---|---|---|
| 2,052,815 | 9/1936 | Wilsing | 74—769 |
| 2,784,328 | 3/1957 | Schaffler-Glossl | 200—18 |
| 3,027,435 | 3/1962 | Shlesinger | 200—17 XR |
| 3,047,683 | 7/1962 | Shlesinger | 200—18 XR |
| 3,176,089 | 3/1965 | Blibtreu et al. | 200—18 |
| 3,247,333 | 4/1966 | Bruckhoff | 200—153.16 XR |

ROBERT K. SCHAEFER, Primary Examiner

J. R. SCOTT, Assistant Examiner

U.S. Cl. X.R.

200—153; 74—568